Feb. 11, 1941.   P. LANDROCK   2,231,765
OPTICAL PROJECTION APPARATUS
Original Filed July 6, 1938   5 Sheets-Sheet 1
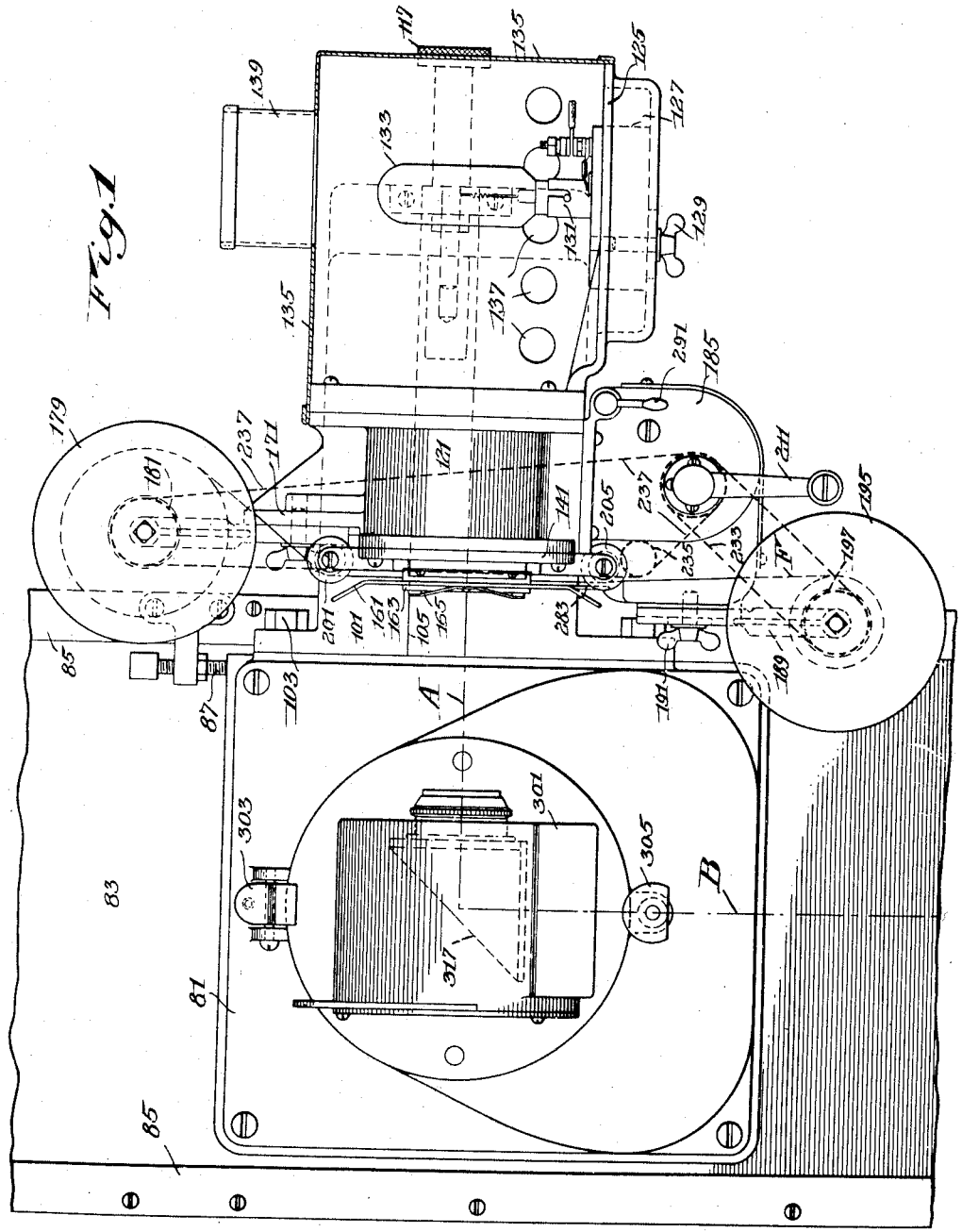
INVENTOR.
Paul Landrock
BY Cumpston & Shepard
his ATTORNEYS

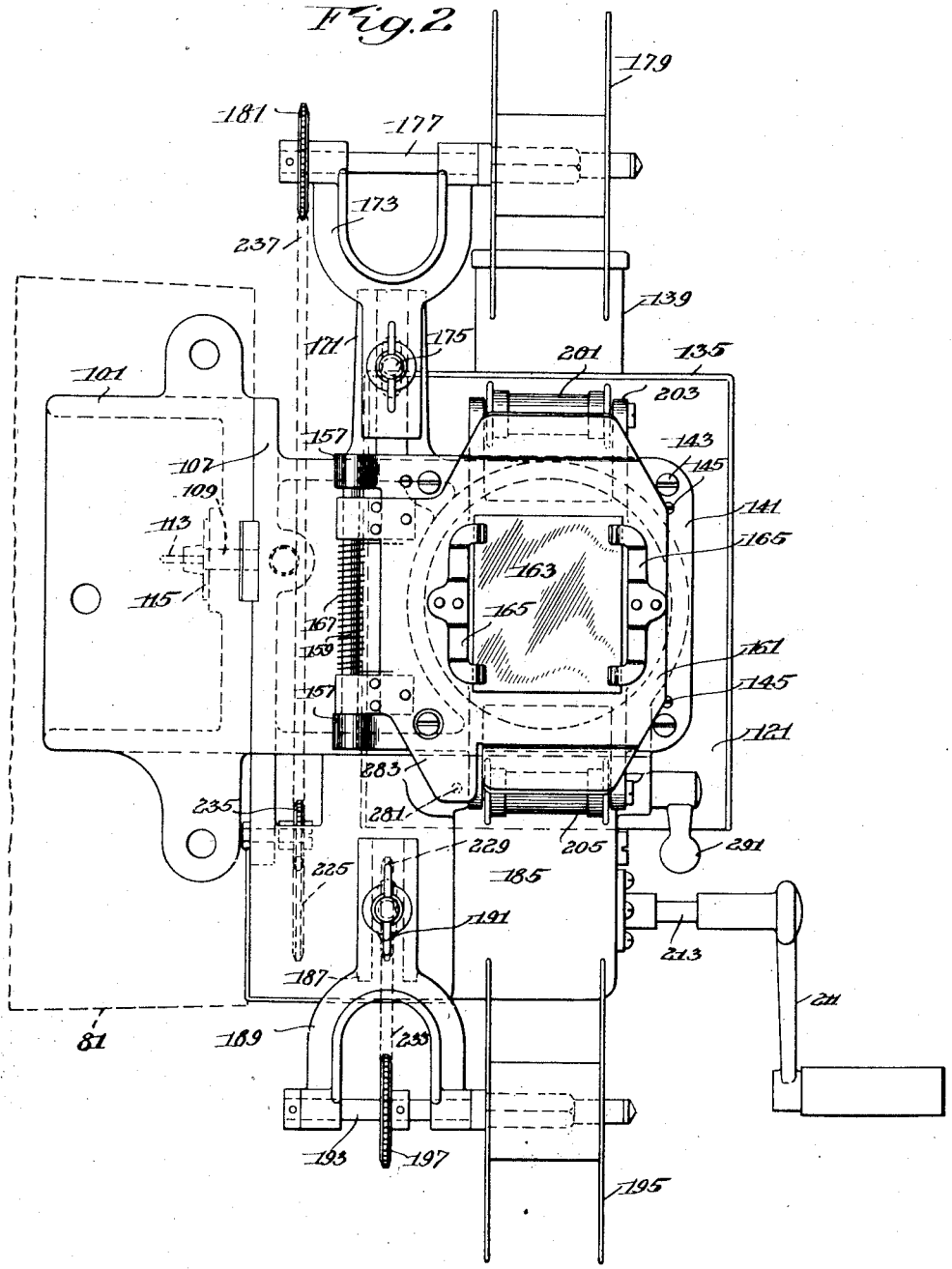

Feb. 11, 1941. P. LANDROCK 2,231,765
OPTICAL PROJECTION APPARATUS
Original Filed July 6, 1938 5 Sheets-Sheet 3
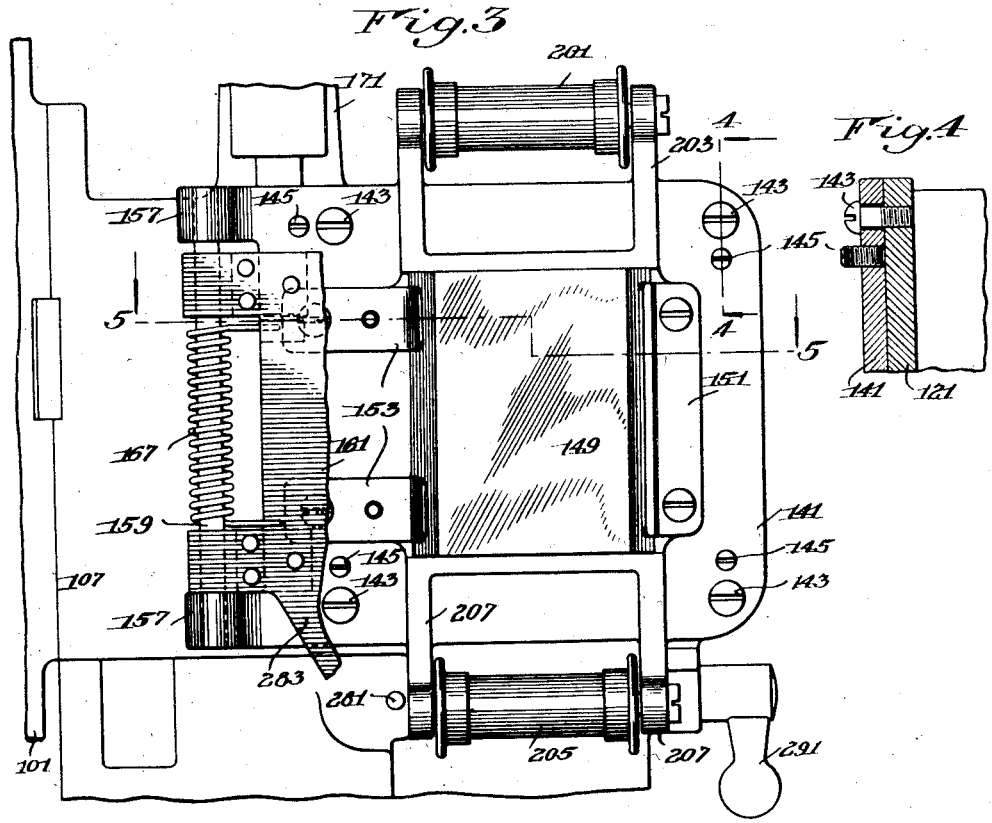
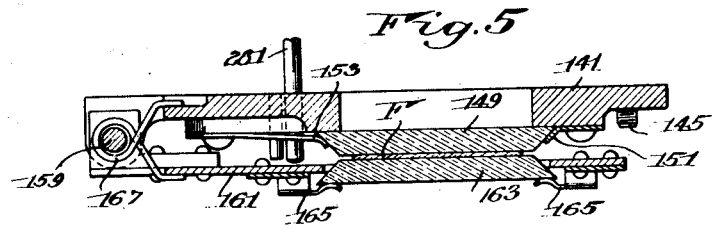
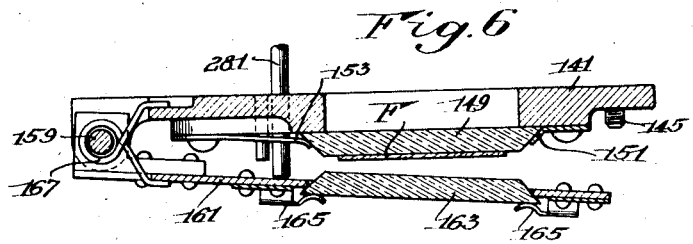
INVENTOR.
Paul Landrock
BY Cumpston & Shepard
his ATTORNEYS

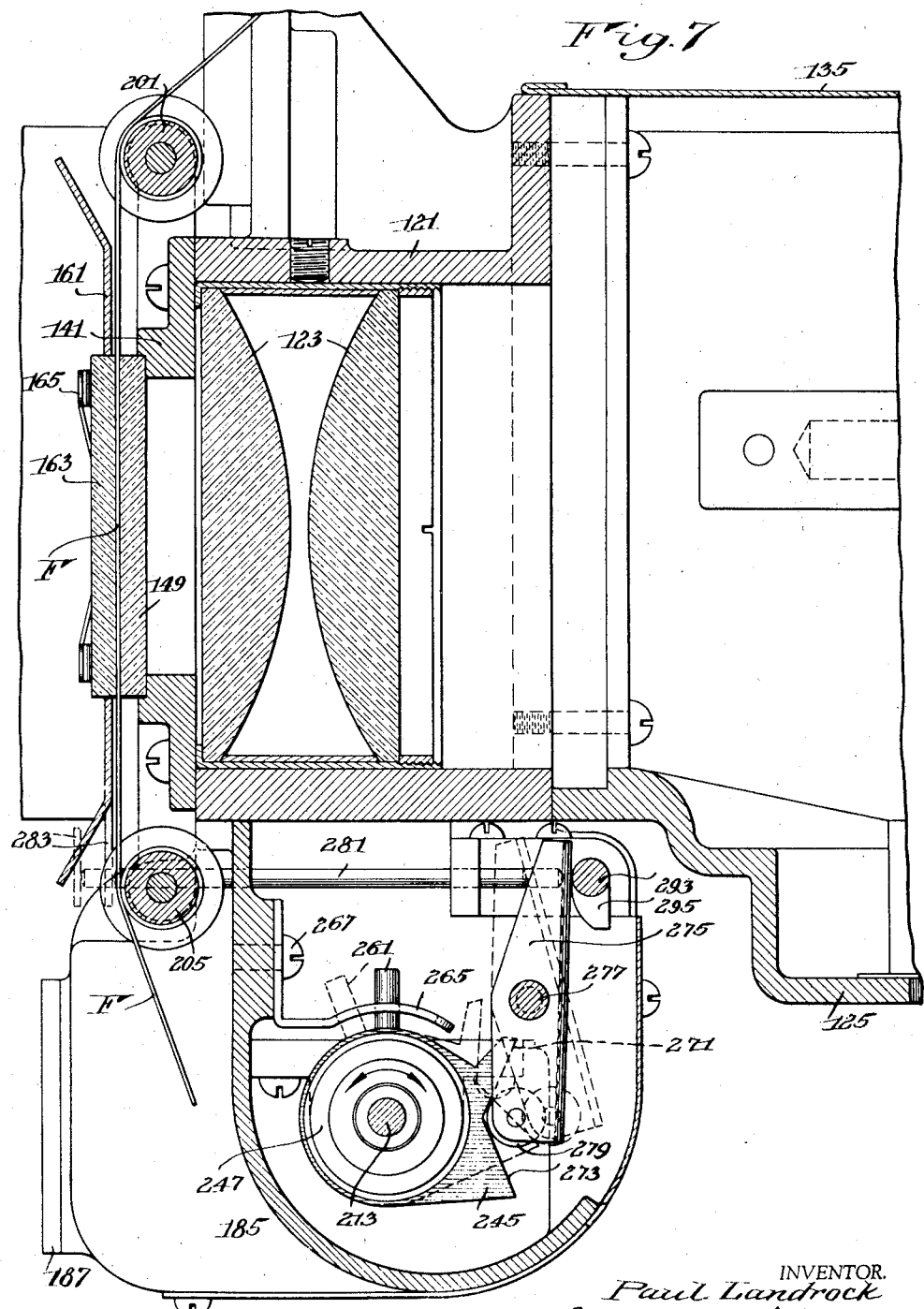

Feb. 11, 1941.  P. LANDROCK  2,231,765
OPTICAL PROJECTION APPARATUS
Original Filed July 6, 1938    5 Sheets-Sheet 5

INVENTOR.
Paul Landrock
BY Cumpston & Shepard
his ATTORNEYS

Patented Feb. 11, 1941

2,231,765

UNITED STATES PATENT OFFICE 2,231,765

OPTICAL PROJECTION APPARATUS

Paul Landrock, Rochester, N. Y., assignor to Photostat Corporation, Providence, R. I., a corporation of Rhode Island Original application July 6, 1938, Serial No. 217,710. Divided and this application April 28, 1939, Serial No. 270,589

9 Claims. (Cl. 88—28)

The invention relates to optical projection apparatus, intended particularly for the projection of images, preferably on an enlarged scale, onto a suitable viewing screen, or onto sensitized sheet material in order to make a photographic print, or both.

An object of the invention is the provision of generally improved and simplified and more satisfactory projection apparatus for projecting an image of a small transparency, whether this transparency be part of a long strip or roll of material, or whether it be a small separate piece, and so designed that when the transparency is part of a strip, successive portions of the strip may be brought quickly into proper position to have their images projected, in rapid succession.

Another object is the provision of such apparatus so designed and constructed that the size of a portion of the transparency which is to be projected can be readily changed.

Still another object is the provision of simple and effective means for holding a transparency truly flat while light is being projected through it, and for relieving the flattening pressure on the transparency when it is to be moved, to avoid scratching or other damage to the transparency.

A further object is the provision of simple and effective apparatus for projecting images of transparencies forming parts of a long strip, so designed and constructed that the strip may be readily fed in either direction at will, by moving a crank or other suitable operating member in one direction or the other.

To these and other ends the invention resides in certain improvements and combinations of parts, all as will be hereinafter more fully described, the novel features being pointed out in the claims at the end of the specification.

In the drawings:

Fig. 1 is a front elevation of the apparatus of the present invention;

Fig. 2 is a side elevation thereof;

Fig. 3 is a view similar to a portion of Fig. 2, on a larger scale, with certain parts omitted and parts broken away in order better to show the parts beneath;

Fig. 4 is a vertical section taken substantially on the line 4—4 of Fig. 3;

Fig. 5 is a horizontal section taken substantially on the line 5—5 of Fig. 3, with the transparency flattening means in effective position;

Fig. 6 is a view similar to Fig. 5 with the transparency flattening means opened to release the transparency;

Fig. 7 is a vertical section taken substantially centrally through part of the apparatus;

The same reference numerals throughout the several views indicate the same parts.

Figure 8:
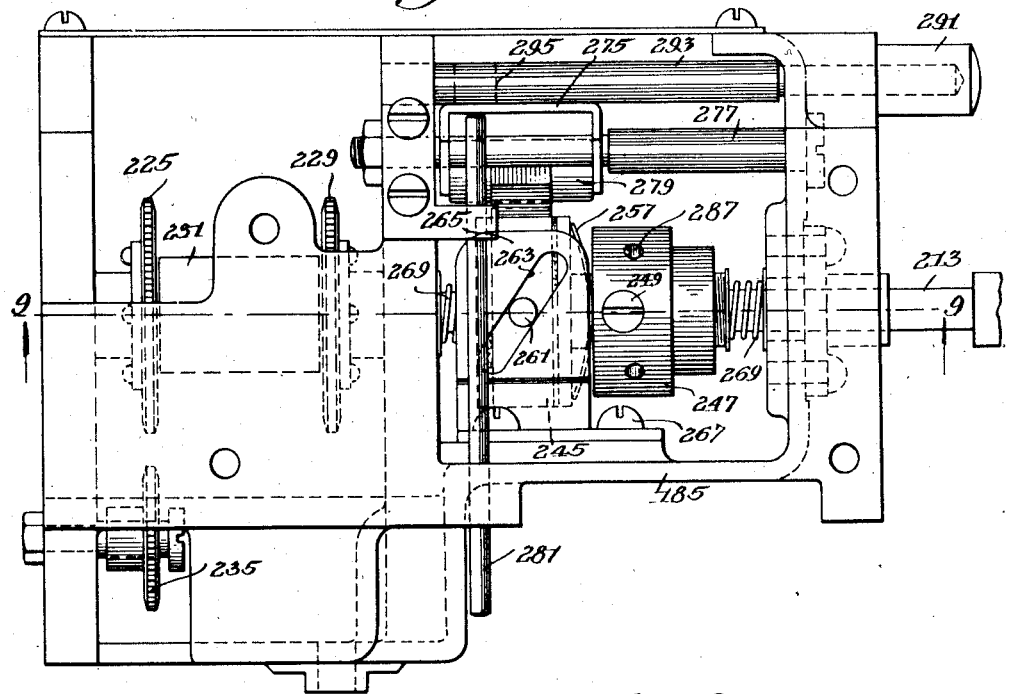
Fig. 8 is a plan of the mechanism shown in the lower part of Fig. 7 with superimposed parts removed for the sake of clearness.

This application is a division of my parent application, Serial No. 217,710, filed July 6, 1938, for Photographic apparatus. In said parent application, the projection apparatus forming the subject matter of the present divisional application is shown applied to a photographic copying camera which includes, as shown in Figs. 1 and 2 of the present drawings, a housing 81 projecting forwardly from a board 83 slidable vertically on the front face of the camera front member in guideways formed by grooves in the strips 85. Upward and downward motion of the housing 81 and board 83 is limited by an upper stop 87 (Fig. 1) and by a similar lower stop (not shown). The projection apparatus of the present invention is, however, independent of the details of the copying camera with which it is preferably associated, and is capable of use without such camera, so that the camera itself need not be further disclosed in this application.

The preferred use of the projection apparatus of the present invention is to project enlarged images of transparencies onto a viewing screen or onto sensitized sheet material to make an exposure thereof, or onto both. The word "transparency" and its derivatives, as used in this application, is not intended in a narrow or technical sense, but is intended to include all films, plates, slides, etc., which are rendered visible by light projected through them or parts of them, or from which enlarged images may be made by projecting light through them or parts of them. For instance, the word as here used includes images on motion picture film or other strip film (whether negative or positive) as well as images on glass plates or on relatively thin and transparent paper.

Referring now to Figs. 1 and 2, the preferred illustrative embodiment of the invention includes a bracket 101 detachably secured to the housing 81 by means of removable bolts 103. This bracket 101 has an approximately horizontal guideway 105 forming a track along which is movable a second bracket 107 secured to the bracket 101 by means of the bolts 109 which extend through slots in the bracket 101 and which have wing nuts 113 bearing against a slidable resilient spring plate 115 which covers the slots. An adjusting screw 117 mounted for rotation on the bracket 101 but held against axial movement thereon, is screwed into a tapped opening in the bracket 107, so that rotation of the screw 117 moves the bracket 107 in one direction or the other along its trackway 105 on the bracket 101, the wing nuts 113 being left sufficiently loose to allow such adjusting movement. The spring 115 holds the parts tightly together notwithstanding this slight looseness of the wing nuts.

On this bracket 107, and movable bodily therewith, when the bracket is adjusted, is what may be termed the light projecting assembly and the transparency holding assembly. The light projecting assembly includes a somewhat annular or barrel-shaped casing section 121 (Figs. 1 and 7) within which is removably mounted a condensing lens system having condensing lenses of any suitable number and arrangement, two such lenses being shown at 123 (Fig. 7). Extending rightwardly from the condenser casing 121, when the parts are viewed from the front as in Figs. 1 and 7, is a lamp housing having a floor 125 and a lamp block 127 slidable toward and away from the condenser lenses 123 along a groove in the floor, the block 127 being held in any position to which it is set by means of a wing head 129 on a clamping bolt. On the block 127 is a lamp base 131 in which is mounted an incandescent bulb 133, the filament of which is so set (by shifting the block 127 toward or away from the condenser lenses) as to be at the focus of the condensing lens system, to produce a strong beam of parallel light rays to the left of the condensing lens system, in known manner.

Sheet metal side and top walls 135, forming part of the lamp housing, enclose the lamp 133. Air inlet holes 137 are provided in the side walls near their bottom edges, and a stack or chimney 139 extends upwardly above the top wall, so that the air may circulate within the lamp housing to keep the lamp as cool as practicable.

At the left end of the casing section 121 which holds the condensing lenses, there is a plate 141 (Figs. 1 and 3 to 7) secured to lateral flanges on the casing 121 by means of screws 143, and having associated jack screws 145 (Figs. 3 and 4) threaded through the plate 141 and bearing against the member 121. This plate 141 has a large rectangular aperture alined with the optical axis of the condenser lens system, and around the aperture is a seat for a plate 149 of glass or other transparent material, held against the seat by the clips 151 and 153. This plate 149 has lateral edges which may be beveled as shown in Figs. 3 and 5, for cooperation with the holding clips 151 and 153, but the main faces of the plate are preferably plane and parallel to each other. By suitably adjusting the holding screws 143 and the jack screws 145, the plane of the plate 149 may be made truly perpendicular to the optical axis of the condensing lens system, notwithstanding manufacturing inaccuracies.

The plate 141, near its top and bottom edges, is extended rearwardly of the apparatus (to the left when viewed as in Figs. 2 and 3) to provide bosses 157 in which is mounted a substantially vertical pintle 159 forming a pivot for a plate 161 having an aperture in line with the optical axis of the condensing lens system. Extending across this aperture is a transparent plate 163 which may be similar to or a duplicate of the transparent plate 149, likewise having lateral edges which are beveled, the beveled edges preferably being faced toward the edges of the opening in the plate 161, as shown in Figs. 5 and 6. Resilient spring clips 165 (Figs. 2, 5, and 6) secured to the plate 161 approximately midway of their heights, have upper and lower ends overlying the transparent plate 163 and tend to hold the beveled edges of this transparent plate against the lateral edges of the opening in the plate 161 in which the transparent plate is mounted. The extreme width of the transparent plate is greater than the width of such opening, so that the beveled edges seat against the edges of the opening and prevent the transparent plate from moving entirely through the opening.

A spring 167 is coiled around the pintle 159, with one end of the spring engaged against the stationary plate 141 and the other end engaged against the plate 161 in a direction to tend to swing the plate 161 flat against the plate 141, thus tending to bring the opposed faces of the two transparent plates 149 and 163 into contact with each other or to bring them against an interposed film or other transparency indicated at F in Fig. 5. The strength of the spring 167 is preferably somewhat greater than the strength of the spring clips 165, so that the plate 161 is closed against the plate 141 with sufficient force to displace the spring clips 165 slightly, thus insuring that the plate 163 will seat evenly against the interposed transparency F throughout the entire width thereof, irrespective of variations in the thicknesses of different transparencies, within reasonable limits.

If only a part of the whole image on the transparency interposed between the plates 149 and 163 is to be projected and enlarged, then an opaque mask with an opening of the appropriate size, may be placed on that surface of the plate 163 which is remote from the transparency F, the edges of the mask being slipped under the ends of the spring clips 165, to hold the mask in place. It is but the work of an instant to take out one mask and insert another mask having a different sized opening.

When the image to be projected and enlarged is on an individual transparency, the glass plates 149 and 163 are separated from each other by swinging the plate 161 on the pintle 159 against the tension of the spring 167, and the transparency is placed between the two glass plates, whereupon the glass plates are brought together again, to clamp the transparency between them in order to hold the transparency frictionally in place. The same procedure may be followed when the transparency to be projected is one of a series of images on a short strip of film, too short to be reeled and handled in the manner of a long roll or strip. But when the transparency constitutes one "frame" or image on a long strip such as a roll of motion picture film or similar film for use in a still camera, then means is provided for handling the roll of film and for moving it quickly past the optical axis of the condensing lens system, to bring any selected image into proper projecting position.

This strip film or roll film handling means includes a bracket 171 extending upwardly from the top of the condenser housing 121, and a Y-shaped bracket 173 (Fig. 2) mounted on the bracket 171 and slidable vertically thereon for purposes of adjustment, being held in adjusted position by the clamp screw 175. In the bracket 173 is journaled an approximately horizontal shaft 177 the forward end of which is of the usual partly square and partly circular periphery, as indicated in Fig. 2, to receive a film reel 179 of any usual construction. A sprocket 181 is fixed to the rear end of the shaft 177.

Secured to the bottom of the condenser lens housing 121 and extending downwardly therefrom is a housing or casing 185 (Figs. 1, 2, and 7) one face of which is provided with an approximately vertical guideway 187 for receiving a Y-shaped bracket 189 similar to the bracket 173, but inverted with respect thereto. The bracket 189, like the bracket 173, is adjustable along its guideway and is held in any adjusted position by a clamping bolt 191. Mounted in bearings in this bracket 189 is a shaft 193 similar to the shaft 177 and likewise having a forwardly projecting end which is partly circular and partly squared, to receive a film reel 195 which is alined with the reel 179, as shown in Fig. 2, both lying in the same plane perpendicular to the shafts 177 and 193, although the two reels may be somewhat offset from each other horizontally in a direction transverse to their shafts, as indicated in Fig. 1. The shaft 193 carries a sprocket 197 (Fig. 2) similar to the sprocket 181 but lying in a different plane perpendicular to the shaft 193 from the plane of the sprocket 181, the sprocket 197 preferably being mounted between the two arms of the bracket 189.

A strip of film wound on the upper reel 179 may extend downwardly therefrom and over a guide roller 201 (Figs. 1, 2, 3, and 7) rotatably mounted on arms 203 extending upwardly from the plate 141, the film then passing from this guide roller downwardly between the transparent plates 149 and 163 and contacting with another guide roller 205 similarly rotatably mounted on arms 207 extending downwardly from the plate 141, from which lower guide roller the film F may extend to the lower reel 195.

The strip of film may be advanced in one direction or the other by turning the appropriate reel 179 or 195 by direct hand pressure, but it is preferable to provide convenient crank means for driving one reel or the other at will, and it is also preferable that mechanism be provided for automatically opening the transparent plates 149 and 163 to relieve the pressure on the film when it is being moved. Such mechanism preferably includes a readily accessible crank 211 (Figs. 1 and 2) mounted on a shaft 213 journaled in the previously mentioned housing 185 and arranged approximately parallel to the shafts 177 and 193. The shaft may be mounted in a ball bearing 215 (Fig. 9) in a rear wall of the housing 185, and a ball bearing 217 in an intermediate partition thereof, and a plain bearing 219 on the front wall of the housing. The shaft is mounted for limited axial movement in its bearings so that, when the shaft is moved axially in one direction or the other, a toothed driving element 221 (Fig. 9) pinned to the shaft can be brought into engagement either with the tooth 223 secured to a sprocket 225, or with a tooth 227 secured to a sprocket 229, both of these sprockets being rotatably mounted on the shaft 213 and being held against lateral movement relatively to the casing 185, by hubs engaging the parts 215 and 217, and by a spacing sleeve 231 interposed between the sprockets.

When the shaft 213 is moved forwardly of the apparatus (to the right when viewed as in Figs. 2 and 9) the driving element 221 is engaged with a tooth 227 on the sprocket 229, and turning the crank 211 in a clockwise direction when viewed as in Fig. 1 will drive the sprocket 229 in a corresponding direction. The sprocket 229 is alined with the sprocket 197 on the shaft 193, and connected thereto by a drive chain 233 (Figs. 1 and 2) so that the shaft 193 and the reel 195 will be driven from the sprocket 229.

Likewise, when the shaft 213 is moved axially in a rearward direction (to the left when viewed as in Figs. 2 and 9) this engages the driving element 229 with the tooth 223 on the sprocket 225, and if the crank 211 be turned in a counterclockwise direction when viewed as in Fig. 1, this will drive the sprocket 225 in a corresponding direction. The sprocket 225 is alined with the sprocket 181 on the shaft 177 and with an idler or guiding sprocket 235 (Figs. 1 and 8) and a drive chain 237 (Figs. 1 and 2) runs over this sprocket to drive the sprocket 181 and the reel 179 from the sprocket 225.

Figure 9:
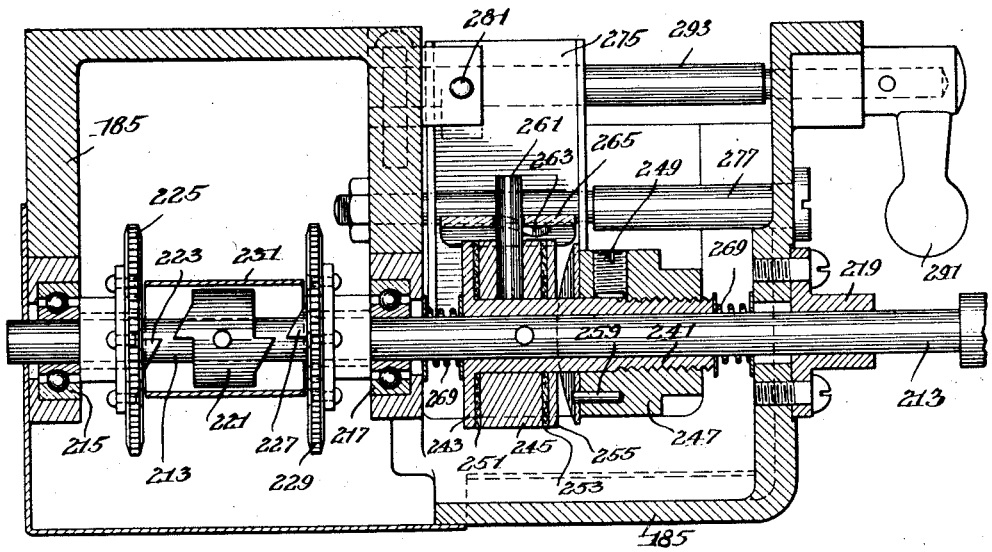
Fig. 9 is a vertical section taken substantially on the line 9—9 of Fig. 8.

In order to move the shaft 213 axially in the proper direction when the crank 211 is rotated, and in order also to open the transparent plates 149 and 163 so they will not bind on the film, the following mechanism is provided, referring now to Figs. 7, 8, and 9. Fixed to the shaft 213 is a sleeve 241 having an outwardly extending annular flange 243 at its rear end. A collar 245 is rotatably mounted on the sleeve 241 between the flange 243 and another collar 247 which is internally threaded and screwed onto a thread on the end of the sleeve 241 remote from the flange 243, and which is held against rotation on the sleeve by a set-screw 249. A layer of friction material 251, such as a fiber washer, or brake lining, or similar material, is interposed between the flange 243 and the adjacent face of the collar 245, and a layer of similar friction material 253 is interposed between the opposite face of the collar 245 and an annular plate 255 surrounding the sleeve 241 and constantly pressed toward the collar 245 by means of a curved spring plate 257 mounted between the plate 255 and the collar 247. A pin 259 prevents the spring plate 257 from turning relatively to the sleeve 241 and collar 259.

The collar 245 has fixed to it an approximately radial pin 261 which extends upwardly from the top of the collar and into an oblique slot 263 in a bracket 265 stationarily mounted in the casing 185 as by means of screws 267 (Fig. 7). Due to the oblique inclination of the slot 263, any turning of the collar 245 will cause this collar to be cammed in a direction axially of the shaft 213. The length of the slot 263 and the oblique inclination thereof is so designed with respect to the distance between the teeth 223 and 227 on the sprockets 225 and 229, that when the shaft 213 is turned in a clockwise direction (when viewed from the front as in Fig. 1) the resultant turning of the collar 245 will, shortly before the pin 261 comes to the corresponding end of its slot 253, move the shaft 213 sufficiently far forwardly to engage the driving member 221 with the tooth 227 on the sprocket 229. Similarly, if the shaft 213 be rotated in a counterclockwise direction, the pin 261 will ride in the opposite direction along the slot 263 sufficiently far to engage the driving member 221 with the tooth 223 on the sprocket 225. Axial movement of the shaft 213 in either direction is resisted but not prevented by the coiled springs 269 which surround the shaft at opposite ends of the sleeve 241 and which constantly tend to return the shaft 213 axially to its central position when it has been displaced in either direction therefrom.

The collar 245 has an extension on one side thereof, which extension is provided with cam faces 271 and 273 (Fig. 7) inclined toward each other and together forming a shallow V-shaped notch. A lever 275, having a generally U-shaped cross section as seen in Fig. 8, is fulcrumed near its midpoint on a shaft 277 and carries near its lower end a roller 279 engaged in the notch formed by the surfaces 271 and 273 of the collar 245. The upper end of the lever lies against one end of a thrust pin 281 mounted for axial movement in the housing 185. The opposite end of the thrust pin 281 bears against an ear 283 (Fig. 2) on the hinged plate 161 on which the glass plate 163 is mounted. When the collar 245 is turned in either direction from its neutral or central position shown in full lines in Fig. 7, one of the surfaces 271 and 273 will thrust against the roller 279 to swing the lever 275 in a counterclockwise direction about its fulcrum 277 to some such position as that shown in dotted lines in Fig. 7. This will cause the upper end of the lever 275 to thrust against the pin 281, moving the pin longitudinally and thus pressing the hinged plate 161 to open the transparent plate 163 away from the plate 149, against the tension of the spring 167.

The parts are so arranged that this opening of the presser plates 149 and 163 will take place before the winding of the film commences, so that the flattening pressure on the film is relieved before the film begins to move. In other words, the various cams and parts above mentioned are so designed that, upon commencing rotation of the shaft 213 in either direction, the turning movement of the collar 245 will first swing the lever 275 to open up the transparent plates 149 and 163, before the turning of the collar 245 has progressed sufficiently far to move the shaft 213 axially to a sufficient extent to drive the sprocket 225 or the sprocket 229. After the initial slight turn of the shaft 213 sufficient to move the presser plate 163 and sufficient to engage one of the sprockets 225 and 229, further or continued rotation of the shaft 213 will cause the sleeve 241 to slip relatively to the collar 245, which collar will be held against further rotation by engagement of the pin 261 with the end of its slot 263, and so long as the turning of the shaft 213 continues, the collar 245 will be maintained in its displaced position, with the presser plate 163 held away from the plate 149, and with the driving connection established between the member 221 and one of the sprockets 225 and 229. So long as the driving of the film reels continues the presser plate 163 can never press against the moving film and cause scratching or damage to the film, because any return of the collar 245 toward its central position sufficiently far to release the pin 281 and allow the plate 163 to press against the film, would necessarily move the shaft 213 axially sufficiently far to disengage the driving connection between this shaft and the sprocket 225 or 229.

If it is found that the friction between the sleeve 241 and the collar 245 is too small or too great, it may readily be adjusted by loosening the set-screw 249 and turning the collar 247 on its threads on the sleeve 241, until the proper degree of frictional drag on the collar 245 is obtained, whereupon the set-screw 249 may be tightened.

Radial holes 287 (Fig. 8) may be placed in the collar 247, to be engaged by an adjusting pin for the purpose of turning this collar on the sleeve 241 when required.

It is desirable also to have means for relieving the pressure of the plate 163 on the film or other transparency, whenever it is desired to do so, without necessarily turning the crank 211 and shaft 213. This may be accomplished by turning a handle 291 (Figs. 1, 2, and 9) on a shaft 293 (Figs. 7, 8, and 9) carrying a cam arm 295 arranged to cooperate with the upper end of the lever 275. Normally the handle 291 hangs straight downwardly as indicated in Figs. 1 and 2, and the cam arm 295 likewise extends downwardly as in Fig. 7, having no effect on the lever 275. If the handle 291 be turned approximately 90° in a clockwise direction from its normal position shown in Fig. 1, this will turn the cam arm 295 90° from the position shown in Fig. 7, which will move the upper end of the lever 275 leftwardly, thrusting against the pin 281 and opening the presser plate 163 away from the plate 149, in exactly the same way as though the lever 275 had been operated by the roller 279 riding on the surface 271 or 273. A flat spot on the end of the cam 295 will lie flat against the surface of the lever 275 and tend to hold the cam in its fully operative position when once it is placed therein, until it is forcibly moved back toward its neutral position.

By use of this handle 291, the presser plate 163 can be released from the plate 149 whenever desired (without reference to turning the crank 211) so that, if the transparency to be projected is not of a character to be wound on the reels 179 and 195 and moved by turning the crank 211, the pressure on the transparency may nevertheless be relieved whenever desired, in order to place the transparency in or remove it from the projecting unit. The handle 291 is also used when threading a strip of film through the machine.

The transparency holding and light projecting assembly above described is mounted so that it projects the image from the transparency along an approximately horizontal line, as indicated by the dot-dash line A in Fig. 1, to an optical unit which is fully described in the above mentioned parent application but which forms no essential part of the subject matter of the present divisional application, and need not be described herein further than to say that it includes a casing 301 (Fig. 1) removably mounted on the front of the housing 81 as by means of a releasable spring latch 303 near its top and a nut 305 near its bottom. Within this casing is suitable light bending means such as a mirror or, preferably, a prism 317, so arranged that light rays approaching the bending means along the axis A from the light projecting assembly will be bent through approximately 90°, and will then be projected along the axis B onto a viewing screen, or onto sensitized sheet material, or to whatever location is desired. A suitable lens system may be located with the light bending means if desired.

In use, when the transparency to be projected is part of a strip or roll of film, such strip is placed on one of the reels 179 or 195, or if already mounted on a reel, this reel is placed on one of the shafts 177 or 193, and the strip is threaded over the guide rollers 201 and 205, and between the plates 149 and 163, the handle 291 being operated to separate these plates during the threading operation. Then the handle 291 may be restored to its normal position, and the crank 211 may be operated in one direction or the other to wind successive portions of the strip past the glass presser plates 149 and 163, until the desired one of the images or "frames" is found. Turning the crank 211 in either direction automatically separates the pressure plate 163 from the plate 149 by causing the cam surface 271 or 273 on the collar 245 to shift the lever 275 to press against the thrust pin 281 to move the plate 163, so that there is no pressure on the strip of film while it is being fed past the plates 149 and 163, thus avoiding scratching or other damage to the film. As soon as turning of the crank 211 ceases, the springs 269 throw the collar 245 back to its central position, unclutching the crank 211 from the reels 179 and 195 and releasing the thrust on the pin 281 so that the spring 167 may press the plate 163 firmly toward the plate 149 to hold the film truly flat between them.

I claim:

1. The combination of two shafts each adapted to receive a film reel, two transparent plates, one mounted for movement toward and away from the other, for receiving between them and holding flat a section of a strip of film extending from a reel on one of said shafts to a reel on the other of said shafts, a third shaft, means for turning said third shaft in either direction at will, a member rotatably mounted on said third shaft and frictionally clutched thereto to tend to turn with said third shaft, means dependent upon movement of said rotatably mounted member for operatively connecting said third shaft to one of said reel shafts when said third shaft is turned in one direction and to the other of said reel shafts when said third shaft is turned in the opposite direction, said rotatably mounted member having an approximately V-shaped notch therein, a roller engaging in said notch, and an operative connection between said roller and one of said transparent plates to move said one of said plates away from the other plate when said roller is displaced by turning said third shaft in either direction.

2. The combination of two shafts each adapted to receive a film reel, two transparent plates, one mounted for movement toward and away from the other, for receiving between them and holding flat a section of a strip of film extending from a reel on one of said shafts to a reel on the other of said shafts, a third shaft arranged substantially parallel to said two reel shafts, means for turning said third shaft, mechanism operatively connecting said third shaft to one of said reel shafts to turn the reel shaft when said third shaft is turned, a cam member rotatably mounted on said third shaft and frictionally coupled thereto to tend to turn therewith, a cam follower cooperating with said cam member and moved thereby when said cam member is turned upon rotation of said third shaft, and means operated by said cam follower for moving said movable one of said transparent plates away from the other one thereof to relieve pressure upon the film when said third shaft is turned to move the film.

3. The combination of two shafts each adapted to receive a film reel, two transparent plates, one mounted for movement toward and away from the other, for receiving between them and holding flat a section of a strip of film extending from a reel on one of said shafts to a reel on the other of said shafts, a third shaft, a member rotatably mounted on said third shaft and operatively connected to one of said reel shafts, another member rotatably mounted on said third shaft and operatively connected to the other of said reel shafts, a driving element fixed to said third shaft between said two rotatable members and engageable with either of said rotatable members in driving relation thereto by axial movement of said third shaft with respect to said rotatable members, a part rotatably mounted on said third shaft and held against axial displacement thereon, frictional means tending to turn said part with said shaft but permitting said part to slip relatively to said shaft, and a part fixed against movement with respect to said rotatable members in a direction axially of said shaft, one of said parts having a slot extending in a direction oblique to the axis of said third shaft and the other of said parts having a projection extending into said slot, the parts being so arranged that upon turning said third shaft in one direction, said part on said third shaft will initially turn therewith and said oblique slot and said projection will cooperate to cause relative axial movement between said third shaft and said rotatable members, establishing a driving connection between said third shaft and one of said rotatable members to drive one of said reel shafts, and upon turning said third shaft in the other direction, a driving connection will similarly be established between said third shaft and the other of said rotatable members to drive the other of said reel shafts.

4. A construction as described in claim 3, further including a cam on said part mounted on said third shaft, a cam follower cooperating with said cam and moved thereby from a rest position to an effective position when said part turns with said third shaft in either direction from a normal rest position, and means operated by movement of said follower from said rest position to said effective position for moving said movable one of said transparent plates away from the other one thereof to relieve the pressure of said plates upon the film when the film is to be fed by turning said third shaft.

5. Optical projection apparatus of the type including two reel shafts each for receiving a reel for holding a strip of film bearing an image which is to be projected, characterized by the provision of a third shaft mounted for rotation and for limited axial movement, an oblique cam surface mounted in fixed position, frictional drag means mounted on said third shaft and cooperating with said cam surface to cause axial movement of said third shaft in one direction upon rotation thereof in one direction and axial movement of said third shaft in the opposite direction upon rotation thereof in the opposite direction, and means dependent upon said axial movements of said third shaft for operatively connecting said third shaft to one of said reel shafts to rotate such reel shaft when said third shaft is turned in one direction and for operatively connecting said third shaft to the other of said reel shafts to rotate such shaft when said third shaft is turned in the opposite direction.

6. Optical projection apparatus of the type including two reel shafts each for receiving a reel for holding a strip of film a portion of which is to be projected, and means including a movable presser member for holding a portion of said film in flat condition while light is being projected therethrough, characterized by the provision of a third shaft mounted for rotation and for limited axial movement, mechanism automatically effective upon turning said third shaft in one direction to move said third shaft axially in one direction and effective upon turning said third shaft in the opposite direction to move said shaft axially in the opposite direction, said mechanism including a member frictionally mounted on said third shaft to tend to turn therewith and a stationary oblique cam surface cooperating with said member to displace said member and with it said shaft in a direction axially of said shaft when said member is turned, means dependent upon axial movement of said third shaft for operatively connecting said third shaft to one of said reel shafts to turn such reel shaft when said third shaft is turned in one direction and for operatively connecting said third shaft to the other of said reel shafts to turn such reel shaft when said third shaft is turned in the opposite direction, and means effective automatically upon turning said third shaft in either direction for relieving the pressure of said presser member against said film.

7. Optical projection apparatus of the type including two reel shafts each for receiving a reel for holding a strip of film a portion of which is to be projected, and means including a movable presser member for holding a portion of said film in flat condition while light is being projected through such portion, characterized by the provision of a third shaft mounted for rotation and for limited axial movement, an oblique cam surface, frictional drag means mounted on and tending to turn with said third shaft and cooperating with said cam surface to cause axial movement of said third shaft in one direction upon rotation of said shaft in one direction and axial movement of said third shaft in the opposite direction upon rotation thereof in the opposite direction, means dependent upon said axial movements of said third shaft for operatively connecting said third shaft to one of said reel shafts to rotate such reel shaft when said third shaft is turned in one direction and for operatively connecting said third shaft to the other of said reel shafts to rotate such reel shaft when said third shaft is turned in the opposite direction, and means operated by the turning movement of said frictional drag means independently of axial movement of said third shaft for relieving the pressure of said presser member against said film and for maintaining the pressure relieved so long as rotation of said third shaft continues.

8. Apparatus for projecting images of sections of a strip of film, including in combination a presser plate for holding the film flat while light is being projected through it, a shaft rotatable to feed said film, a member frictionally mounted on and tending to turn with said shaft, a V-shaped notch in said member, a lever carrying a portion engaged in said notch to be displaced thereby when said member is turned in either direction from a predetermined position, and a plunger operated by displacement of said lever and acting upon said presser plate to relieve the pressure of said presser plate upon said film so long as said lever continues to be displaced.

9. Apparatus for projecting images of sections of a strip of film, including in combination a presser plate for holding the film flat while light is being projected through it, a shaft mounted for rotation in either direction to feed said film in either direction, a collar mounted on said shaft and frictionally connected thereto to tend to rotate therewith, stop means for limiting the extent of rotation of said collar, a cam surface on said collar, and means including a cam follower cooperating with said cam surface and moved thereby in response to rotary movement of said collar, substantially at the commencement of rotation of said shaft, for relieving the pressure of said presser plate against said film when said shaft rotates.

PAUL LANDROCK.